Nov. 27, 1945. A. J. ACKER 2,389,584
DOLLY
Filed Aug. 5, 1943

Inventor
Albert J. Acker
BY
Parker, Carlson, Pitzner & Hubbard
Attorneys.

Patented Nov. 27, 1945

2,389,584

UNITED STATES PATENT OFFICE 2,389,584

DOLLY

Albert J. Acker, Muskegon, Mich., assignor to Manning, Maxwell & Moore, Inc., Muskegon, Mich., a corporation of New Jersey Application August 5, 1943, Serial No. 497,433

7 Claims. (Cl. 280—61)

The invention relates to equipment for moving heavy objects and more particularly to an improved roller skid plate or dolly.

One object of the invention is to provide a dolly constructed and arranged so that it may be driven under the object to be moved in the manner of a wedge and adapted when so inserted to provide free rolling support for the object.

Another object is to provide a dolly having a platform shaped and dimensioned so that it may be driven under heavy objects with a minimum of effort and without danger of slipping, which may be readily turned to steer the object in a selected direction and which is adapted to distribute the load over a relatively large surface while being inserted in place so that gouging of the surface upon which the object is resting is effectually avoided.

It is also an object of the invention to provide a dolly of simple compact construction which is efficient and reliable in operation and capable of withstanding hard usage.

Other objects and advantages of the invention will become apparent from the following detailed description of the preferred embodiment illustrated in the accompanying drawing in which.

Figure 1:
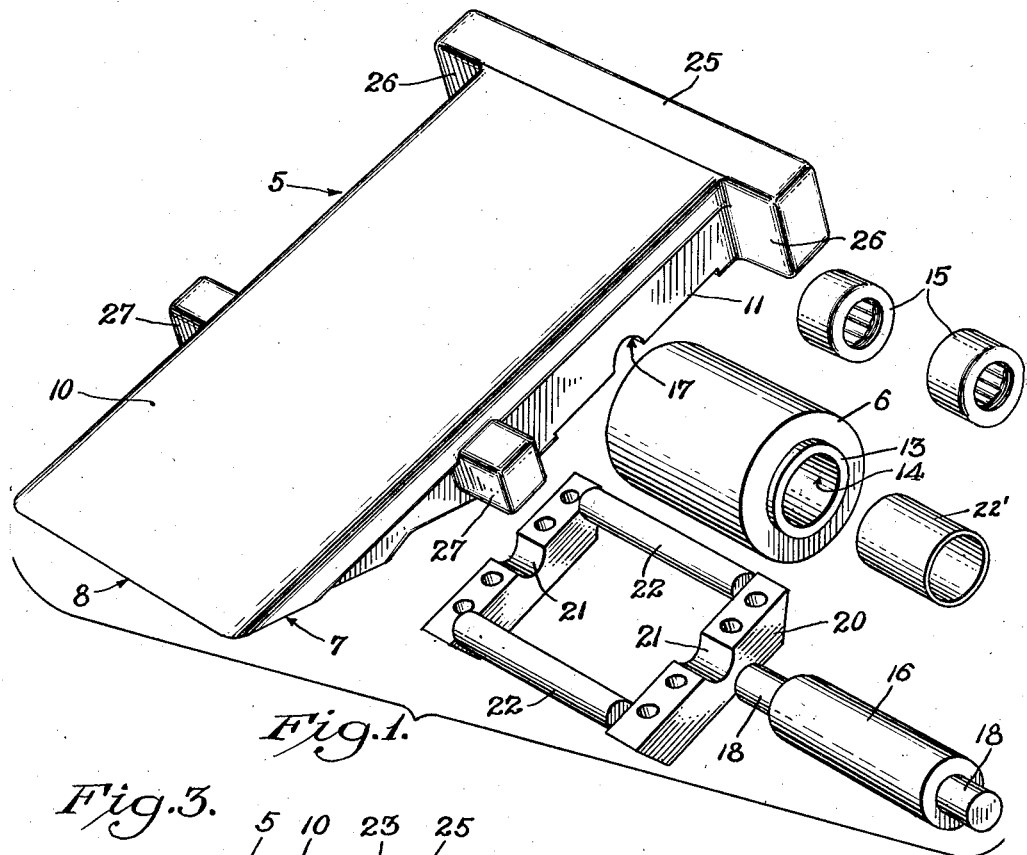
Figure 1 is an exploded perspective view of the improved dolly.
Figure 3:
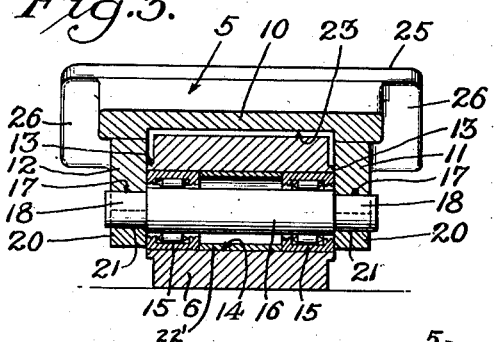
Fig. 3 is a transverse sectional view taken on the line 3—3 of Fig. 2.

The improved dolly comprises generally an elongated platform 5 having a plane top surface and adapted to be supported adjacent one end by a roller 6. While the dolly is being inserted under the object, the end opposite that is supported by the roller is adapted to rest upon the floor and for this purpose is provided with a flat bearing surface 7. The bearing surface 7 is disposed at an angle to the top surface of the platform preferably in a plane tangent to the periphery of the roller 6 and intersecting the platform surface to define a relatively thin sharp edge 8. Thus the top surface of the platform and the plane defined by the bearing surface and the roller 6 form the opposite sides of the wedge-shaped body. Due to this wedge shape, the dolly platform may be readily driven under an object to be moved without preliminary lifting or tilting of the same. When the dolly has been driven under the object sufficiently to bring the load imposed thereon directly over the axis of the roller 6, the platform automatically tilts upwardly against the bottom of the object and the load is then supported solely upon the roller so that it can be moved very easily.

In the particular dolly selected to illustrate the invention, the platform 5 is generally channel-shaped in cross section comprising a flat generally rectangular top member 10 having depending side members or flanges 11 and 12 along opposite side edges. For economy of manufacture and to provide the ruggedness necessary to enable the dolly to withstand hard usage, the platform may be made in the form of a steel casting or it may be fabricated from steel plates and bars welded together to form a rigid unitary structure.

The roller 6 is preferably mounted on the side members 11 and 12 adjacent one end of the platform hereinafter referred to as the rear end. As herein shown, the roller has its opposite ends turned down to provide integral annular flanges or collars 13 encircling an axial bore 14 extending through the roller. Anti-friction bearings 15 seated in the bore rotatably support the roller on a spindle 16.

For mounting the spindle on the platform, the lower edges of the side members 11 and 12 are formed respectively with semi-cylindrical recesses 17 adapted to receive the ends 18 of the spindle which are preferably of reduced diameter. The spindle is held in assembled relation with the platform structure by a pair of retaining plates 20 removably secured to the lower edges of the side members 11 and 12 by machine screws or the like. As will be seen by reference to Fig. 1, the retaining plates are formed with upwardly opening semi-cylindrical recesses 21 complemental to the recesses 17. Cross members 22 welded or otherwise secured to the retaining plates serve to strengthen the assembly and assist the mounting screws in holding the plates rigidly in place.

The roller 6 is preferably dimensioned lengthwise so that the collars 13 fit snugly against the inner walls of the side members 11 and 12 and the retaining plates 20. Moreover, the bearings 15 are also held snugly against the inner walls of the flanges by a spacing sleeve 22'. The collars and bearings are thus effective to seal the interior of the roller against the entry of dirt or foreign material and are also effective to prevent the leakage of grease or other lubricant with which the interior of the roller may be filled. Effective lubrication of the bearings upon which the roller is supported is thus insured.

In the exemplary dolly, the roller 6 is located so that approximately three-fourths of the platform at the forward end thereof project at one side of the roller axis. While this spacing may vary, of course, it is desirable to locate the roller in a position such that the top surface of the platform is disposed at a relatively small angle to the horizontal when supported by the roller 6 and bearing surface 7. The low angle of inclination facilitates the wedging action by which the platform is inserted under an object and eliminates any tendency of the dolly to slip out from under the load. An angle of inclination between 15° and 20° has been found quite suitable for this purpose. The attainment of this angle of inclination is facilitated by recessing the underside of the platform member 10 as at 23 for the reception of the roller 6.

Figure 2:
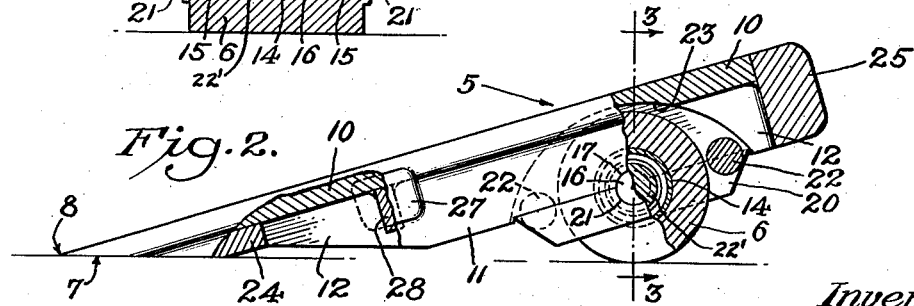
Fig. 2 is a side view of a dolly with parts broken away to show the structure in vertical section.

As stated heretofore, the forward end of the platform is beveled on its underside to form the bearing surface 7 by which the forward end of the platform is supported on the floor while the dolly is being inserted under the object to be moved. In order to distribute the load over a relatively large area during the insertion process and thus prevent the platform from digging into or gouging the floor, a cross member 24, either cast integrally with the member 10 or attached thereto as by welding is provided on the underside of the platform and arranged to extend between the side members 11 and 12 parallel and closely adjacent to the beveled end portion 7 of the top member 10. The lower edge of the cross member is beveled to form an extension of the bearing surface 7 as shown in Fig. 2. It will also be observed that the side members 11 and 12 are also beveled at their forward ends so as to clear the floor.

The dolly constructed as described above may be conveniently driven under a heavy object by means of a sledge hammer or other suitable pounding instrument. The dolly is, accordingly, provided with a strike 25 for taking the impact of the instrument. As herein shown, the strike 25 comprises a heavy metal bar of generally rectangular cross section welded or otherwise secured to the rear end of the platform member 10 and the adjacent ends of the side members 11 and 12.

Preferably the ends of the strike are extended at each side of the platform as at 26 to present striking surfaces by which the dolly may be turned in the direction in which the load is to be moved. Turning of the dolly for steering purposes is also facilitated by provision of suitable rigid lugs 27 projecting laterally from opposite sides of the platform and spaced substantially from the supporting roller. In the particular dolly illustrated, the lugs 27 are located approximately midway between the front end of the platform and the roller 6. A cross strut 28 extending across the underside of the platform between the lugs 27 prevents distortion of the side members 11 and 12 by the force applied to the lugs.

When the dolly is to be used to move a large heavy object as for example, a box or crate such as those used for packing machinery, the sharp tip 8 of the dolly platform is placed on the floor closely adjacent one side of the box. The strike 25 at the rear end of the platform is then struck with a hammer or other suitable instrument to wedge the platform under the box. The box is thus gradually lifted on the side at which the platform is inserted, no preliminary lifting or tilting of the box being necessary.

Due to the relatively low angle of inclination of the top surface of the platform, relatively little force is required to insert the dolly and any tendency to slip out from under the box is minimized. During the initial process of insertion, the load imposed on the dolly is distributed over a relatively large bearing area 7 which rests flat upon the floor by reason of its location in a common plane with the periphery of the roller 6. There is, accordingly, no tendency for the platform to dig in or gouge the floor.

The top surface of the platform maintains its inclined position and until the point at which the load is applied to the dolly is located above the axis of the roller 6, whereupon the platform automatically tilts up against the bottom of the box, thus relieving the bearing surface 7 of its load and transferring the same to the roller 6. Additional dollies may be inserted under the box in the same manner so that the entire weight of the box is supported on the dolly rollers 6.

For easy movement of the load, the dollies are all alined in the direction in which the movement is to take place. Such alinement may be effected conveniently by tapping the lugs 26 or 27 of one or more of the dollies. Likewise, all of the dollies may be quickly and easily turned and alined for a different direction of movement. Thus the laterally projecting lugs provide a convenient and practical means for steering a load supported on a plurality of the improved dollies.

It will be appreciated that the dolly may be used as a stationary roller when desired by simply inverting the platform.

I claim as my invention:

1. A dolly for moving heavy objects having, in combination, a top member comprising a flat generally rectangular plate, depending side members rigid with the top member, a roller journaled in said side members and extending below the lower edges of the same to provide rolling support for the dolly, said side members terminating at a point spaced substantially from one end of the top member, and a cross member secured to the underside of said top member between said one end of the top member and the adjacent ends of the side members, said cross member and said top member having their lower surfaces inclined at an angle to the top surface of the top member to present a relatively wide bearing surface lying in a plane tangent to the periphery of said roller.

2. A dolly for moving heavy objects comprising, in combination, a generally rectangular top member, depending side members rigid with the top member, a roller journaled on the side members, said top member being beveled on its underside at one end to present a bearing surface disposed in a plane tangent to the periphery of said roller and cooperating with the roller to support the top member in a position to permit said one end of the top plate to be driven under the object to be moved, and a strike rigidly secured to the other end of the top plate and to the adjacent ends of the side members.

3. A dolly comprising, in combination, an elongated platform having a smooth top surface defining one side of a wedge shaped body, a beveled surface at one end of the platform intersecting said top surface, a roller mounted beneath the platform, said roller and said beveled surface defining the other side of the wedge shaped body, and a strike on the other end of the platform positioned to receive the impacts of a pounding instrument for driving the dolly under an object to be moved.

4. A dolly for moving heavy objects comprising, in combination, an elongated platform terminating at one end in a wedge shaped tip, roller means adapted to support the platform with the tip positioned for insertion beneath an object to be moved, a strike at the other end of the platform for receiving the impacts of a pounding instrument whereby the dolly may be driven under the object to be moved, and a pair of lugs rigid with the platform and spaced from said roller means, said lugs projecting laterally from opposite sides of the platform to receive the impacts of a pounding instrument whereby the dolly may be turned to position the roller means for moving the object in a selected direction.

5. A dolly for moving heavy objects comprising, in combination, a rigid one-piece platform of generally channel shaped cross-section including an elongated top member and depending side members, said top member terminating in a wedge shaped tip and having on its underside a relatively wide bearing surface adjacent said tip, means acting jointly with said bearing surface to support the platform for insertion of the tip under an object to be moved including a roller dimensioned to fit between the side members, and a spindle mounted on said side members rotatably supporting said roller, said spindle being spaced substantially from the tip portion of the top member and having its axis disposed parallel thereto.

6. In a dolly, in combination, an elongated platform having a plane top surface, a roller mounted beneath said platform with its axis disposed transversely of the same, a beveled surface at one end of the platform intersecting the top surface to define a wedge shaped tip, said beveled surface lying in a plane tangent to said roller and cooperating with the latter to support the platform in a position to permit said tip to be inserted under an object to be moved without preliminary lifting of the object, and a strike rigid with said platform positioned to receive the impacts of a pounding instrument for driving the dolly under the object.

7. A dolly comprising, in combination, an elongated platform terminating at one end in a wedge shaped tip, roller means operative to support said platform with said tip positioned to be driven under an object to be moved, and a pair of strikes rigid with said platform and projecting laterally from opposite sides thereof to receive the impacts of a pounding instrument.

ALBERT J. ACKER.